United States Patent [19]
Gibbs et al.

[11] Patent Number: 6,085,321
[45] Date of Patent: Jul. 4, 2000

[54] UNIQUE DIGITAL SIGNATURE

[75] Inventors: Benjamin K. Gibbs, Colorado Springs; G. R. Konrad Roeder, Woodland Park, both of Colo.

[73] Assignee: Omnipoint Corporation, Bethesda, Md.

[21] Appl. No.: 09/134,133

[22] Filed: Aug. 14, 1998

[51] Int. Cl.[7] ................................................. H04L 9/32
[52] U.S. Cl. ........................ 713/170; 713/168; 713/180; 705/76
[58] Field of Search ................................ 380/23, 25, 49, 380/30; 713/200, 162, 168, 170, 180, 181; 705/80, 12, 76, 77

[56] References Cited

U.S. PATENT DOCUMENTS

| | | | |
|---|---|---|---|
| 4,281,215 | 7/1981 | Atalla | 178/22.08 |
| 4,309,569 | 1/1982 | Merkle | 178/22.08 |
| 4,405,829 | 9/1983 | Rivest et al. | 178/22.1 |
| 4,713,780 | 12/1987 | Schultz et al. | 364/514 |
| 4,881,264 | 11/1989 | Merkle | 380/25 |
| 4,934,846 | 6/1990 | Gilham | 400/104 |
| 4,977,595 | 12/1990 | Ohta et al. | 380/24 |
| 5,093,918 | 3/1992 | Heyen et al. | 395/725 |
| 5,142,577 | 8/1992 | Pastor | 380/21 |
| 5,204,961 | 4/1993 | Barlow | 395/725 |
| 5,224,164 | 6/1993 | Elsner | 380/44 |
| 5,231,668 | 7/1993 | Kravitz | 380/28 |
| 5,307,412 | 4/1994 | Vobach | 380/42 |
| 5,319,710 | 6/1994 | Atalla et al. | 380/23 |
| 5,349,649 | 9/1994 | Iijima | 395/275 |
| 5,351,293 | 9/1994 | Michener et al. | 380/21 |
| 5,367,573 | 11/1994 | Quimby | 380/25 |
| 5,371,796 | 12/1994 | Avarne | 380/23 |
| 5,377,354 | 12/1994 | Scannell et al. | 395/650 |
| 5,432,852 | 7/1995 | Leighton et al. | 380/30 |
| 5,434,918 | 7/1995 | Kung et al. | 380/25 |
| 5,440,634 | 8/1995 | Jones et al. | 380/24 |
| 5,473,691 | 12/1995 | Menezes et al. | 380/25 |

(List continued on next page.)

FOREIGN PATENT DOCUMENTS

| | | | |
|---|---|---|---|
| WO 97/46962 | 12/1997 | WIPO | G06F 17/60 |
| WO 97/49251 | 12/1997 | WIPO | H04N 11/00 |
| WO 98/00787 | 1/1998 | WIPO | G06F 13/00 |
| WO 98/18249 | 4/1998 | WIPO | H04L 29/06 |
| WO 98/37680 | 8/1998 | WIPO . | |
| WO 98/51064 | 11/1998 | WIPO | H04M 3/42 |
| WO 98/51116 | 11/1998 | WIPO | H04Q 11/04 |
| WO 99/04344 | 1/1999 | WIPO | G06F 13/00 |

OTHER PUBLICATIONS

R. J. Hall, How to Avoid Unwanted Email, Communications of the ACM, Mar. 1998, vol. 41, No. 3, pp. 88–95.

A. Arensburger, et al., To Take Arms Against a Sea of Email, Communication of the ACM, Mar. 1995, vol. 38, No. 3, pp. 108–109.

T. Bass, et al., A Simple Framework for Filtering Queued SMTP Mail (Cyberwar Countermeasures), MILCOM 97 Proceedings, Nov. 5, 1997, Vol. 3, pp. 1140–1144.

L. Blum, et al., A Simple Unpredictable Pseudo–Random Number Generator, Siam Journal On Computing, May 1986, vol. 15, No. 2, pp. 364–383.

Nist, The Digital Standard Signature Standard, Communications of the Law, Jul. 1992, vol. 35, No. 7, pp. 36–40.

C. Dwork, et al., Pricing Via Processing or Combatting Junk Mail, Proc. of Crypto, Aug. 1992, pp. 39–145.

(List continued on next page.)

*Primary Examiner*—Gilberto Barron, Jr.
*Assistant Examiner*—Ho S. Song
*Attorney, Agent, or Firm*—Lyon & Lyon LLP

[57] ABSTRACT

A method and apparatus for a unique digital signature is provided. According to one aspect of the invention, a unique digital signature comprises an adapted digital signature and a service id. The adapted digital signature provides temporary or restricted privileges for a particular electronic service. In one embodiment, the electronic service is electronic message forwarding. In another embodiment, the electronic service is electronic media delivery. An authentication log file is maintained for recording status information concerning unique digital signatures.

26 Claims, 7 Drawing Sheets

U.S. PATENT DOCUMENTS

| | | | |
|---|---|---|---|
| 5,479,514 | 12/1995 | Klonowski | 380/47 |
| 5,493,692 | 2/1996 | Theimer et al. | 455/26.1 |
| 5,537,475 | 7/1996 | Micali | 380/30 |
| 5,539,826 | 7/1996 | Dwork et al. | 380/25 |
| 5,542,046 | 7/1996 | Carlson et al. | 395/186 |
| 5,592,553 | 1/1997 | Guski et al. | 380/23 |
| 5,604,803 | 2/1997 | Aziz | 380/25 |
| 5,606,668 | 2/1997 | Shwed | 395/200.11 |
| 5,619,648 | 4/1997 | Canale et al. | 395/200.01 |
| 5,638,446 | 6/1997 | Rubin | 380/25 |
| 5,732,137 | 3/1998 | Aziz | 380/25 |
| 5,740,361 | 4/1998 | Brown | 395/187.01 |
| 5,751,813 | 5/1998 | Dorenbos | 380/49 |
| 5,751,814 | 5/1998 | Kafri | 380/49 |
| 5,764,762 | 6/1998 | Kazmierczak et al. | 380/4 |
| 5,764,772 | 6/1998 | Kaufman et al. | 380/30 |
| 5,787,178 | 7/1998 | Schwenk | 380/30 |
| 5,825,883 | 10/1998 | Archibald et al. | 380/25 |
| 5,826,022 | 10/1998 | Nielsen | 395/200.36 |
| 5,850,446 | 12/1998 | Berger et al. | 380/24 |
| 5,852,665 | 12/1998 | Gressel et al. | 380/30 |
| 5,857,022 | 1/1999 | Sudia | 380/23 |
| 5,958,051 | 9/1999 | Renaud et al. | 713/200 |

OTHER PUBLICATIONS

P.G. Neumann, Risks in Digital Commerce, Communications of the ACM, Jan. 1996, vol. 39, No. 1, p. 154.

N. Asokan, et al., The State of the Art in Electronic Payment Systems, Computer, The Future of Micro Processors, Sep. 1997, pp. 28–35.

M. Wagner, Cyber Junk, Computerworld, Aug. 26, 1996, vol. 30, No. 35, p. 28.

B. Cole–Gomolski, Message Managers Aim to Control Junk E–mail, Computerworld, May 5, 1997, vol. 31, No. 18.

P. Collinson, Putting a Stop to Spam, Centaur Communications EXE, Nov. 3, 1997.

Table of Contents, Choking on Spam, Nov. 1997, vol. 17, No. 13, p. 105.

Communications Software, Help Block Spam, Dec. 1997, vol. 10, No. 12, p. 286.

PC/Computing, Spam Killers, Dec. 1997, vol. 10, No. 12, p. 433.

D. Blankenhorn, Datamation, You Can Win The War Against Spam!, <http://www.datamation.com/PlugIn/issues/1998/august/08web.html>, Aug. 1998.

<http://www.lantimes.com/97/97/sep/709c040a.html>, Sep. 1997.

Y. Matias, et al., Lightweight Security Primitives for E–Commerce, in or after Jun. 1997, pp. 1–8.

E. Gabber, et al., Curbing Junk E–Mail via Secure Classification, in or after May 1998, pp. 1–12.

D. Bleichenbacher, et al. On Secure and Pseudonymous Client–Relationships with Multiple Servers, May 1998, pp. 1–14.

E. Gabber, et al., How to Make Personalized Web Browsing Simple, Secure, and Anonymous, Feb. 1977, pp. 1–16.

L.C. Cranor, et al., Spam!, Communications of the ACM, vol. 41, No. 8, Aug. 1998, pp. 74–83.

R.J. Hall, Channels: Avoiding Unwanted Electronic Mail, American Mathematical Society, 1997, pp. 1–17.

The Lucent Personalized Web Assistant, A Bell Labs Technology Demonstration, <http://www.bell–labs.com/projects/lpwa/>, on or after Jun. 1997, pp. 1–2.

News & Info, News Release, Lucent Technologies Introduces Technology That Protects Net Surfers' Privacy, <http://www.lucent.com/press/0697/9706.bla.html>, Jun. 10, 1997, pp. 1–2.

M. Stutz, WIREDNEWS, Covering Your Tracks via a Helping Hand, <http://www.wired.com/news/technology/story/4375.html>, Jun. 10, 1997, pp. 1–3.

Lucent Introduces Personal Protection Technology, News Watch, <http://www.zdnet.com/icom/news/199706/12/news2.html>, Jun. 12, 1997, pp. 1–2.

a2i(rahul.net) anti–junk–email–features, <http://www.rahul.net/guest/nojunk.html>, 1998, p. 1–2.

a2i–nojunk—anti–junk–email system, <http://www.rahul.net/gu7est/a2i–nojunk.1.txt>, date unknown, p. 1–16.

W. Diffie, The First Ten Years of Public–Key Cryptography, Proceedings of the IEEE, vol. 76, No. 5, May 1988, p. 560–577.

UNIQUE DIGITAL SIGNATURE

FIELD OF THE INVENTION

The present invention pertains to the field of electronic user identification, including, more specifically a unique digital signature.

BACKGROUND OF THE INVENTION

In the 1960's, the Advanced Research Projects Agency (APRA) of the United States Department of Defense developed and deployed a network of interconnected computers primarily designed to allow research organizations and universities to more easily exchange information. Called the ARPANET, this network of computers was used primarily by the scientific and academic community for research oriented tasks and information exchange. In the 1980's, the ARPANET was replaced by the NSFNET, which is commonly referred to today as the Internet.

Whereas the Internet was certainly useful in scientific and academic circles, it suffered a serious problem, namely, its interface was difficult to use. In 1989, an English computer scientist named Timothy Berners-Lee introduced the World Wide Web ("WWW"). The WWW was originally designed to facilitate communications over the Internet between physicists working for the European Laboratory for Particle Physics, but the WWW's ease of use caught on quickly with the both the scientific and non-academic communities. This surge in popularity spurned the development of numerous WWW browsers that enable users to "surf" the WWW.

Recently, publishers and other information providers have been moving to develop new forms of distribution, similar to traditional "snail mail" subscription services, but on the WWW. Newspapers such as the Wall Street Journal have developed internet sites that offer an alternative to the regular print subscriptions at a significantly reduced cost. Similarly, other periodicals and publications have developed websites for paid subscription subscribers too.

Today, most pay-for-use subscription sites on the WWW use userid/password pairs that allow a user to logon to a service and review the content in a publication. Although this system works, there are disadvantages. First, during peak hours, the access points (e.g., gateway servers) to the subscription services are often clogged, either by other users trying to logon to the site or general Internet traffic. Second, the userid/password pair gives varying degrees of access to the content of the websites, but access is typically based upon time and levels of content (e.g., all articles or only some sections/services). Third, paying subscribers often share their userid/password pair with other non-paying users. Fourth, because the userid/password pair has a persistent quality (that is, it tends to remain the same over time) unauthorized use (e.g., hacking, snooping, etc.) is common.

One alternative to the userid/password pair described above is to give access to a user based on the user's computers IP address. Such an alternative is described in U.S. Pat. No. 5,684,951, invented by Goldman, et al. However, in some computer networks, for example computers connected to a Microsoft's NT DHCP (dynamic host configuration protocol) server, are not given permanent IP addresses. Rather, their IP address varies from session to session. If an IP address is not assigned via DHCP, or a similar dynamic scheme, then it is typically permanently assigned to a particular computer, since multiple computers are generally not allowed to have the same IP address on the same network.

Beyond the problems associated with the known userid/password pairs, subscribers of a particular service may not wish to purchase a "bundle" of content for a fixed or flat fee. Subscribers may wish to pay for content on a limited use basis and may further desire to pay only for the information they can actually use or specifically request. In light of the foregoing discussion, there is a need for a different method and apparatus for user authentication to an electronic service.

SUMMARY OF THE INVENTION

The present invention is directed to a unique digital signature comprising a service id and an adapted digital signature. According to one embodiment, the unique digital signature further comprises a domain name.

According to one embodiment, a unique digital signature is created by an electronic commerce system. The electronic commerce system comprises a router, an authenticated message server and an authentication log file.

According to one embodiment, a process for creating a unique digital signature comprises the acts of incrementing an index number and hashing the index number and a system key. Next, a value derived from the hash is concatenated with a service id. In one embodiment, the service id is a local username. In an alternative embodiment, the service id is an automated process. Finally, the concatenated value, the unique digital signature, is returned.

According to one embodiment, an authentication process comprises the steps of extracting an adapted digital signature and a service id from the unique digital signature. In the next step, the service id is tested to ensure it is valid. If the service id is valid, then the adapted digital signature is authenticated, and if the adapted digital signature is positively authenticated, then a status flag is set in a log file to identify the unique digital signature as "used".

As a result of the method and apparatus described herein, unsolicited or undesired electronic messages can be controlled. Additionally, access to electronic service such as electronic media can be provided on an element-by-element basis, rather than on a fixed period subscription basis.

BRIEF DESCRIPTION OF THE DRAWINGS

The present invention is illustrated by way of example, and not by way of limitation, in the figures of the accompanying drawings which like reference numerals refer to similar elements and in which.

DETAILED DESCRIPTION OF THE PREFERRED EMBODIMENT

Figure 1:
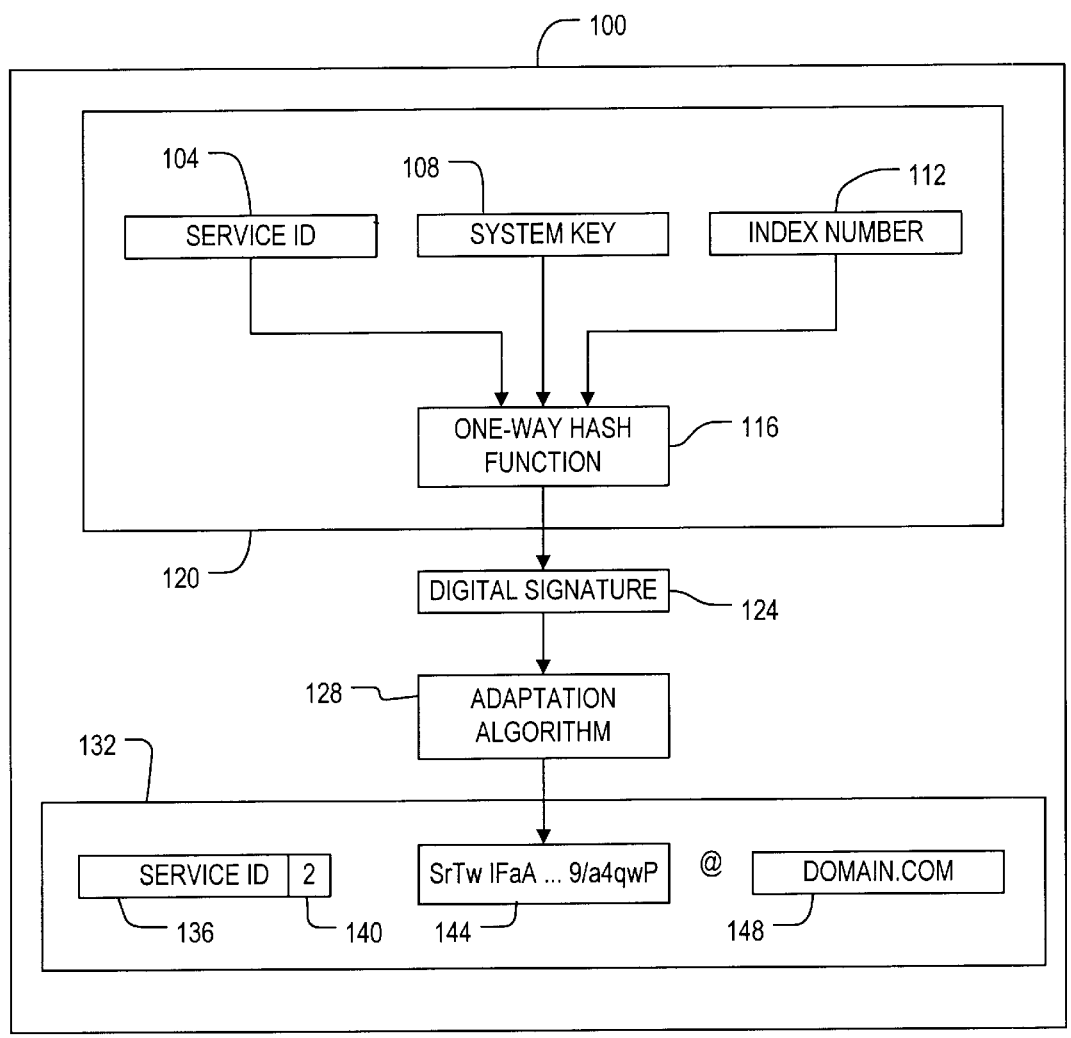
FIG. 1 is a block diagram illustrating a functional description of the creation of a unique digital signature.

FIG. 1 depicts a functional overview of part of an authenticated message server 100 according to one aspect of the invention. According to a presently preferred embodiment, an authenticated message server functionally comprises a digital signature engine 120. The digital signature engine 120 is fed a service id 104, a system key 108 and an index number 112. The digital signature engine 120 preferably operates on the service id 104, the system key 108 and the index number 112 with a one-way hash function 116. The output of the digital signature engine is a fixed-width binary value referred to herein as a "digital signature" 124.

According to a presently preferred embodiment, the MD5 function is the one-way hash function 116. The MD5 function is described in detail in RFC 1321, entitled "The MD5 Message-Digest Algorithm", R. Rivest, 1992, which is incorporated herein by reference. In an alternative embodiment, the SHA-1 function is employed.

Next, an adaptation algorithm 128 performs a base64 conversion of the digital signature 124 and produces an "adapted digital signature" 144. The adapted digital signature 144 is an ASCII value. The adapted digital signature 144 is concatenated, along with other information, to form a unique digital signature 132. The unique digital signature 132 typically comprises three parts: a service id 136, a digital signature 144 and a domain name 148. The service id 104, generally represents an individual or process which should handle an authenticated unique digital signature 132. The adapted digital signature 144 is a special token that contains data that must be authenticated by the authenticated message server 100. Finally, the domain name 148 contains data used by external routers to forward a message to the appropriate message server connected to the Internet.

Fixed-width values may be used in the unique digital signature 132 to ease the separation of the fields, or alternatively, additional characters may be added that will identify the three component parts, such as a period ("."), an underscore ("_"), and/or an at sign ("@"). An additional character is preferably concatenated between the service id 136 and the adapted digital signature 144, as well as between the adapted digital signature 144 and the domain name 148.

According to one embodiment, service id 136 is the same as service id 104. However, according to another embodiment, service id 136 additionally comprises a system key number 140, which is a pointer to the system key 108 used as the input to the one-way hash function 116. Furthermore, it should be noted that service ids 104 and 136 can represent a local username (for example, an alias for an individual user of a message system), or it can represent a local servicename (for example, an alias for an automated process or stored procedure in a messaging system).

The system key 108 is preferably a 256 bit value that changes periodically and is randomly generated by the authenticated message server 100. Further details of the system key 108 and the index number 112 are explained below with reference to FIG. 2.

The index number 112 is a counter, maintained by the authenticated message server 100, that identifies one of a number of unique digital signatures generated for a particular system key 108. The index number 112 is periodically reinitialized by the authenticated message server 100 when a fixed number of unique digital signatures 132 have been generated with a particular system key 108, or when a new system key 108 is created.

Figure 2:
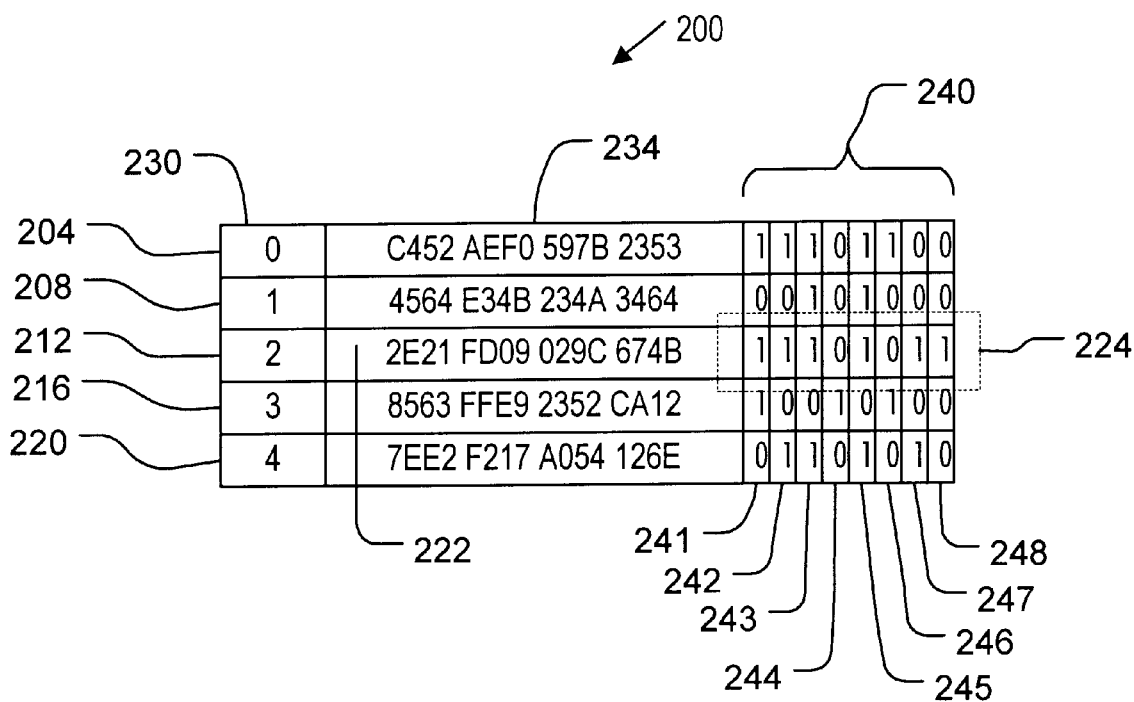
FIG. 2 depicts records in an exemplary authentication log file according to presently preferred embodiment of the invention.

In a preferred embodiment, an authentication log file 200, shown in FIG. 2, is used for recording status information and other information about the creation and authentication of unique digital signatures. Since the unique digital signature 132 is preferably transferable, other methods for validating the unique digital signature (i.e., storing remote user information in a log file) will not necessarily work for the preferred embodiment, for example, the methods disclosed and described in U.S. patent application Ser. No. 09/133,875 filed on the same day herewith. However, if a non-transferable unique digital signature is desired, then the methods and techniques described in Ser. No. 09/133,875, which is incorporated herein by reference in its entirety, can be employed.

FIG. 2 depicts five exemplary records (204, 208, 212, 216 and 220) of an authentication log file 200 according to a presently preferred embodiment of the authentication log file 200. The records of the authentication log file 200 preferably have three fields. The system key number field 230 stores the system key number. Preferably, the system key number 140 (FIG. 1), points to a corresponding record of the authentication log file 200 via the system key number field 230. The system key 108 used by the digital signature engine 120 is stored in system key field 234, and the status field 240 is a bit vector for storing status information about each of the unique digital signatures successfully authenticated by the authenticated message server 100. For simplicity, only 8 bits (241 through 248) of the status field 240 are shown, but hundreds of bits can be used.

Preferably, the authentication log file 200 comprises at least as many records as are desired for cycling the system key for unique digital signatures. For example, if a five day system key cycle is desired, then at least the five records depicted in FIG. 2 would be sufficient. However, if a 100 day system key cycle period is desired, then at least 100 records should be used. An advantage of the configuration of authentication log file 200 depicted in FIG. 2 is that it is highly compact.

According to one embodiment, a value of "1" in a bit of bit vector 240 means that a particular unique digital signature has been used. For example, for record 212, six of the unique digital signatures generated with system key number "2" (system key 222 having a value 2E21 FD09 029C 674B$_{hex}$) have been used, which is evident by counting the six "1"s in the bit vector 224.

The authentication log file 200 is used in two respects. First, it is used to store system keys used for the generation of unique digital signatures. For example, each time the index number exceeds the maximum number of bits allowed in the status field 240 (e.g., a particular bit vector 224), then a new system key is created using a secure random number generator. A new record is subsequently added to the authentication log file 200 and in the new record is stored a new system key number (e.g., "5") and the new, randomly generated system key. Of course, all of the bits of the bit vector comprising the status field 240 are reset to "unused" (e.g., "0"), and the index number 112 is reset too. Additionally, a system key number counter is incremented, so the authenticated message server 100 can quickly track the active system key used for creating unique digital signatures.

It is worth noting that the size, or length of the status field 240 (e.g., bit vector 224) determines the number of unique digital signatures available from a single system key 222. For each system key 222 there exists a block of unique digital signatures that is equal in number to the number of bits in the bit vector 224. Referring again to FIG. 2, exactly 40 unique digital signatures are available. However, if a 64 bit bit vector 224 were used with 256 system keys, then 16,384 unique digital signatures are possible. As will be apparent with reference to FIG. 6 (described in detail below), there is a practical limit on the number of bits in bit vector 224.

According to one embodiment, system keys are periodically recycled. Thus, it is possible for a unique digital signature to expire before it is used. This will allow an authenticated message server administrator the flexibility to control the ultimate size of the authentication log file 200, as well as the duration of the unique digital signature's validity. Preferably, however, there are more records in authentication log file 200 than there are cycles in a system key cycle period.

Before a detailed description of the process for generating and authenticating a unique digital signature is presented, a description of embodiments of a system using a authenticated message server 100 is helpful.

Figure 3:
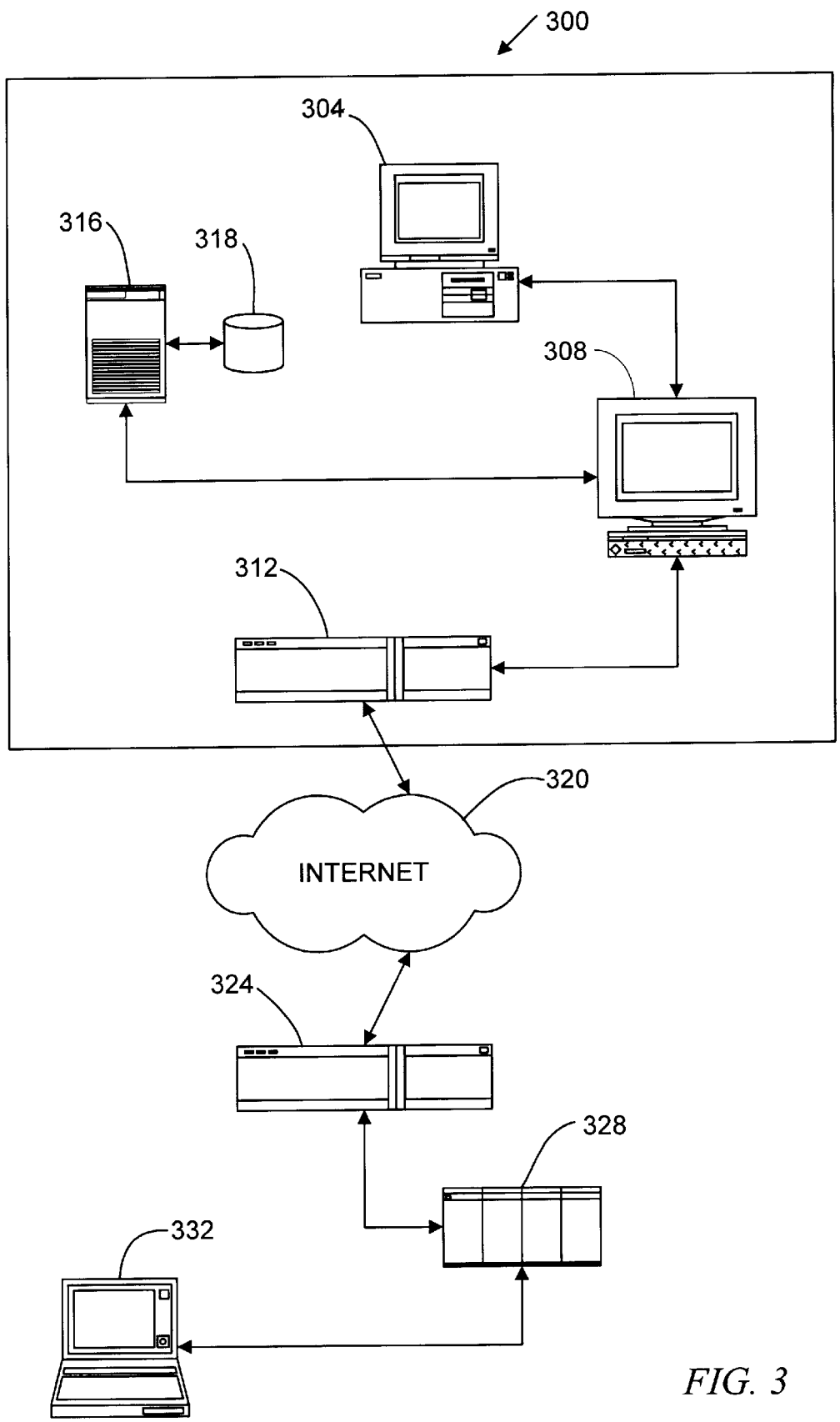
FIG. 3 is a block diagram illustrating one embodiment of a unique digital signature messaging system.

FIG. 3 depicts a unique digital signature messaging system 300 according to one embodiment of the present invention. System 300 includes a server 308, coupled to a terminal unit or personal computer 304, a router 312, an authenticated message server 316 and an authentication log file 318.

The interconnection or coupling mechanism between the various connectors on the devices of the unique digital signature system 300 is preferably a fiber optic network cable, but it can also be a twisted pair, or a wireless interconnection. According to one embodiment, server 308 is a Sun Microsystems SPARC™ system running electronic message software such as Oracle Corporation's InterOffice™ messaging server. Router 312 is a commercially available internet router such as a Cisco Systems 7500 Series router. Authenticated message server 316 can run on a standard personal computer, such as an Intel Pentium™ based microprocessor system. However, authenticated message server 316 is alternatively part of the software component stack added to server 308. In such an embodiment, an application programming interface ("API") for the messaging server 308 is added which provides access to the authenticated message server services. Authenticated message server services include generating and authenticating unique digital signatures as described herein. The unique digital signature system 300 can be highly distributed, wherein incoming and outgoing messages are handled by separate servers or computer systems on an interconnected network (e.g. a LAN).

According to one embodiment of the authenticated message server, a web-based administrator interface is maintained for system configuration, maintenance of subscriber profiles, and retrieval of any log files (e.g., failure log files, authentication log files and message log files). The web-based administrator interface assists in maintaining the unique digital signature system in general since it is possible that the authenticated message server is highly distributed.

Although authentication log file 318 is depicted as a separate element in FIG. 3, it can be embedded into the authenticated message server 316 or the server 308. Further, according to one embodiment, authentication log file 318 is a database, such as Microsoft Corporation's SQL Server™ or Oracle Corporation's Oracle8™.

From the server 308, outgoing messages (including electronic media) for transmission to remote users are passed through an internet gateway router, such as router 312. Router 312 is preferably connected to the Internet via a T1 pipeline, or other leased line. Conversely, messages from the Internet to a particular local user or service associated with the server 308 will be passed through router 312.

A remote user typically resides on a personal computer, such as laptop 332, which is connected to a second server 328. Server 328 is configured similar to server 308, but it can also be a different type of server, such as a Digital Equipment Corporation VAX/VMS™ system. The server 328 is likely to run a different messaging system from that run in server 308. For example, the server 328 may run the University of Washington PINE™ messaging system. Similar to router 312, router 324 is connected to server 328 and the Internet 320.

Figure 4:
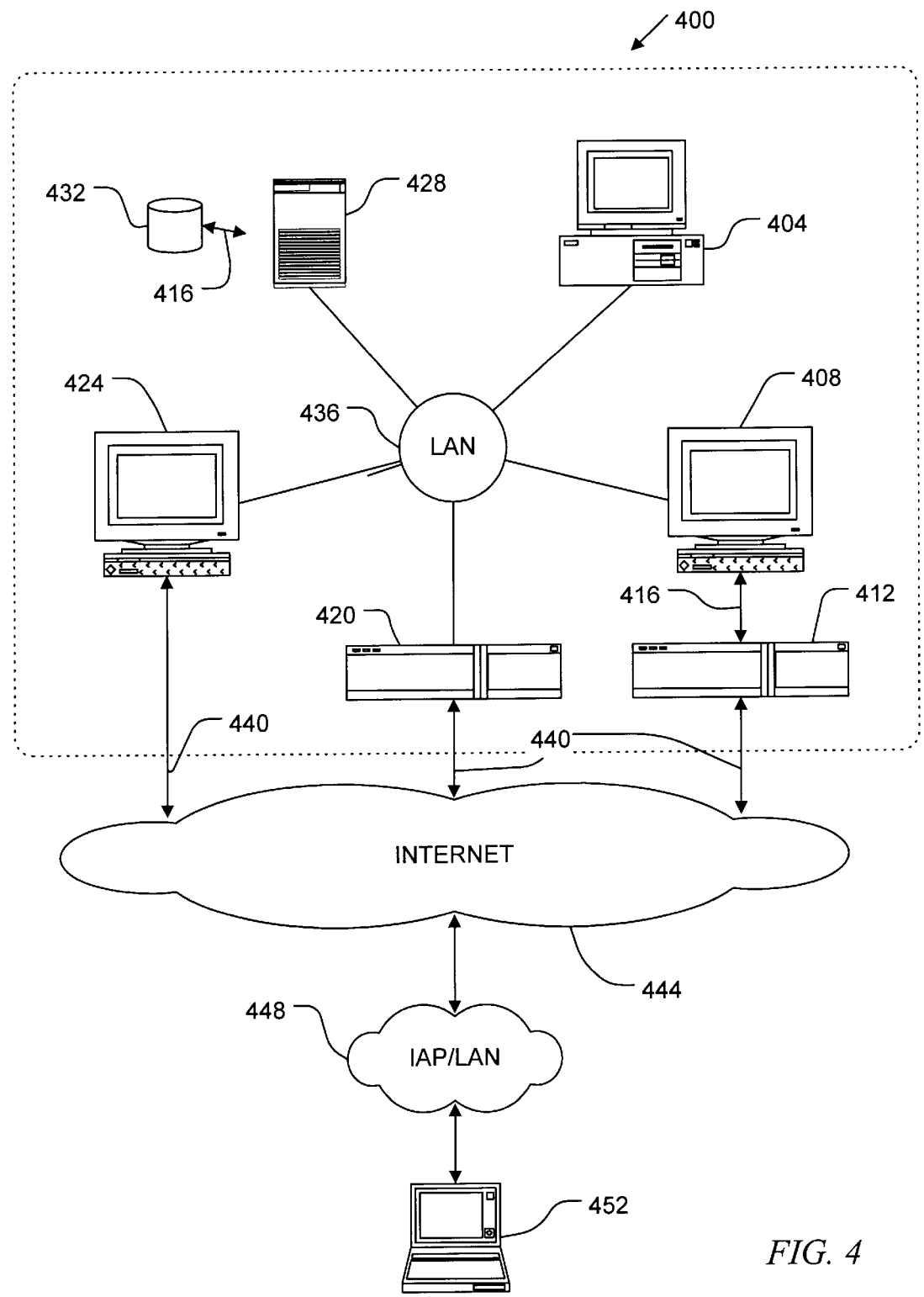
FIG. 4 is a block diagram depicting a preferred embodiment of a unique digital signature electronic commerce system.

Whereas FIG. 3 depicted a unique digital signature system as employed in an electronic messaging application, FIG. 4 depicts a preferred embodiment of a unique digital signature system 400 as employed in an internet server/electronic commerce application. System 400 comprises a computer 404, a message server 408, a message router 412, a proxy server 420, a WWW server 424, an authenticated message server 428, and an authentication log file 432. Components 404, 408, 420, 424 and 428 are shown as interconnected through local area network ("LAN") 436. Authentication log file 432 and message router 412 are depicted as having separate connections 416 to authenticated message server 428 and message server 408 respectively; however, in another embodiment, they too are connected through the LAN 436. Furthermore, authentication log file 432 can be embedded in authenticated message server 428 and authenticated message server 428 can be a part of the software component stack of the message server 408. Additionally, the message server 408 can have integrated therein the functionality of message router 412. Off-the-shelf hardware and software components, similar to those described with reference to FIG. 3, are used for like components depicted and described with reference to FIG. 4.

Unique digital signature system 400 is connected to the Internet 444 via a leased line (e.g., a T1 line.) Leased line 440 is shown functionally divided into three separate lines connected to WWW server 424, proxy server 420, and message router 412, even though only one line is used.

Functionally, WWW server 424 hosts a website with an electronic commerce application and, preferably, an interface (e.g., Perl, CGI, HTML, Java, ASP, ODBC, etc.) to authenticated message server 428. According to one embodiment, WWW server 424 is preferably a Sun Microsystems SPARC™ system, running WWW/Internet server software from Netscape Corporation. A remote user, for example a user on laptop 452, which is connected to the Internet 444 via an internet access provider ("IAP") or local area network ("LAN") 448, is typically connect to WWW server 424 through a dedicated communications port over the Internet 444. Once connected, the remote user at laptop 452 can either purchase a unique digital signature 132, or request a particular piece of media or service from the unique digital signature system 400 using a unique digital signature 132 and the interface on WWW server 424.

According to one embodiment of the unique digital signature system 400, a request for service is received by the authenticated message server 428 via an electronic message (e.g., e-mail) to a service id (e.g., a user or an automated process on computer 404) that passes through message router 412 and message server 408. Similarly, outbound media (in response to a request for service) is returned to the remote user that requested service via message server 408. Outbound media includes, but is not limited to: ASCII text, HTML files, Java applets, WAV files, AVI files, MPEG files and the like. In one embodiment, message server 408 is a wireless short message/paging service ("SMS"), which includes an e-mail to SMS gateway (referred to hereafter as an "SMS gateway") such as one available from Omnipoint Corporation.

According to another embodiment, a service provision server (not shown) is employed in the unique digital signature system 400. The service provision server receives requests from the WWW server 424, and passes them to another server, such as authenticated message server 428. The service provision server functionally acts as an intermediary between the WWW server 424 and the authenticated message server 428, passing requests for unique digital signatures, and requests for service that contain unique digital signatures to the authenticated message server 428 for processing. Physically, the functionality of a service provision server can be added to the WWW server 424 and the authenticated message server 428, rather than residing on a single machine.

The proxy server 420 is not necessary in unique digital signature system 400, but its use is desirable in larger or heavily used electronic service applications. Proxy server 420 is essentially a high-speed cache for one or more internet servers (e.g., WWW server 424) connected to the LAN 436. Functionally, the proxy server 420 strips off the prefix of any URLs received and compares the remaining URL to datafiles stored in its cache. If there is a match, then, rather than requesting the datafile from the WWW server 424 (which is generally more expensive in terms of processing time and I/O), the cached copy I/O on the proxy server 420 is spooled out to the requester, thereby saving a disk I/O and time. According to one embodiment, the proxy server 420 receives a request for service (e.g., send media to a remote user) after the unique digital signature contained in a request for service has been authenticated. In one embodiment, the proxy server 420 runs on a Sun Microsystems SPARC™ system running proxy server software such as NetCache™ from Network Appliance, Inc. in Santa Clara, Calif. (www.netapp.com).

As may be apparent from the drawings and description above with reference to FIG. 3 and FIG. 4, the authenticated message server essentially becomes a gatekeeper for providing access to electronic services.

Figure 5:
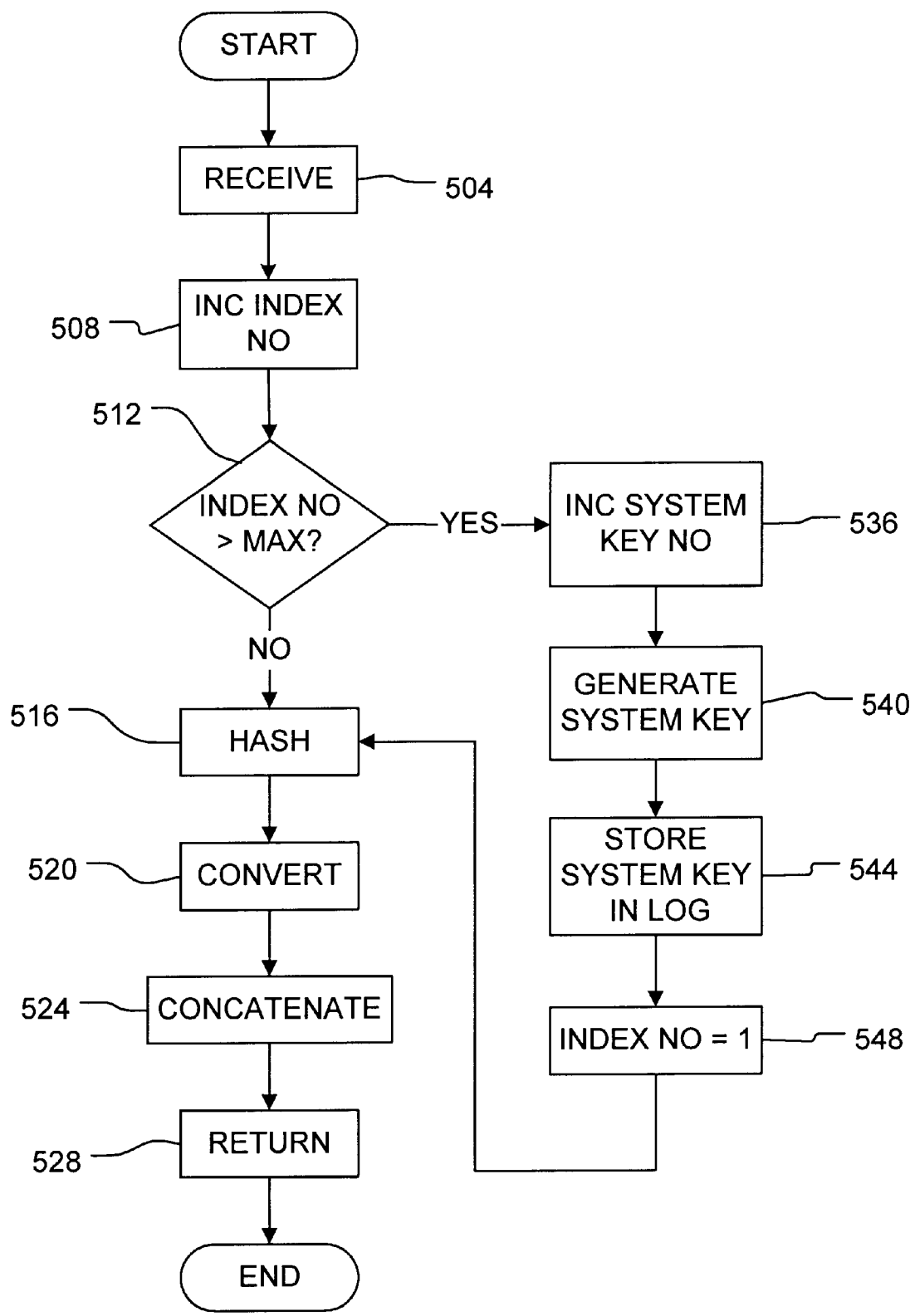
FIG. 5 is a flowchart depicting the steps of generating a unique digital signature.

Turning now to FIG. 5, it depicts the steps for generating a unique digital signature according to one embodiment of the present invention. The following description is made with reference to FIGS. 1 and 4, described above.

Beginning with step 504, a request for a unique digital signature 132 is received by authenticated message server 428. Typically, this request identifies a particular service id 104 for which a unique digital signature 132 is desired. The request typically comes from either the message server 408 or the WWW server 424, however, it can also come from a client application running on a local (e.g., 404) or remote (e.g., 452) user's personal computer. When the request is received, the index number 112 is incremented by one unit in step 508. Next, in step 512, the index number 112 is compared against the maximum number of bits available in the status field 240 (e.g., bit vector 224). If the value of the index number 112 exceeds the number of bits in the status field 240, then the process continues to step 536, otherwise the process continues to step 516, described below.

In step 536, the system key number (not the system key 108) used by the authenticated message server 428 is incremented by one. Next, a new system key 108 is randomly generated at step 540. At step 544, the new system key 108 is stored in the next record of the authentication log file 432 (e.g., record 216, in other words, the record identified by the new system key number). The corresponding status field 240 for the next record is reset so as to indicate that none of the unique digital signatures available for the new system key 108 have been used. In step 548, the index number 112 is reset to "1" and the process continues to step 516.

In step 516, a hash function, preferably a one-way hash function 116, such as the MD5 function, is performed on the system key 108, the service id 104 and the index number 112 by digital signature engine 120. In an alternative embodiment, the SHA-1 hash function is used at step 116. In step 520, the digital signature 124 generated at step 516 is converted from a binary value to a value acceptable for electronic messaging, i.e., ASCII text, by adaptation algorithm 128. The result is an adapted digital signature 144. Preferably, a base64 conversion is performed on coterminous 6 bits of the hash value by adaptation algorithm 128, then the result is concatenated at step 524 with domain name 148, service id 136 and any other characters, values, or symbols used to identify the fields/parts of the unique digital signature 132 (e.g., "@", ".", or "_"). However, other symbols are not necessary if fixed-width/character service ids 136 and adapted digital signatures 144 are used.

Step 520, it should be noted, is not necessary in some applications. The functionality of the adaptation algorithm 128 can be incorporated into the digital signature engine 120 either physically (e.g., with logic components), or by way of the particular hash function 116 used. Furthermore, the adaptation algorithm 128 is not necessary if, for example, the electronic message system supports non-ASCII values. However, according to one embodiment, a limited character ASCII set is used since remote users on legacy electronic message and existing telephone systems can still type the unique digital signature without special software (or hardware).

According to one embodiment of the unique digital signature 132, system key identification information is added to service id 104, such as the system key number 144, so that the system key 108 used to generate the unique digital signature 132 can be quickly identified. The result is service id 136. In an alternative embodiment, the system key identification information is added to the adapted digital signature 144.

Figure 6:
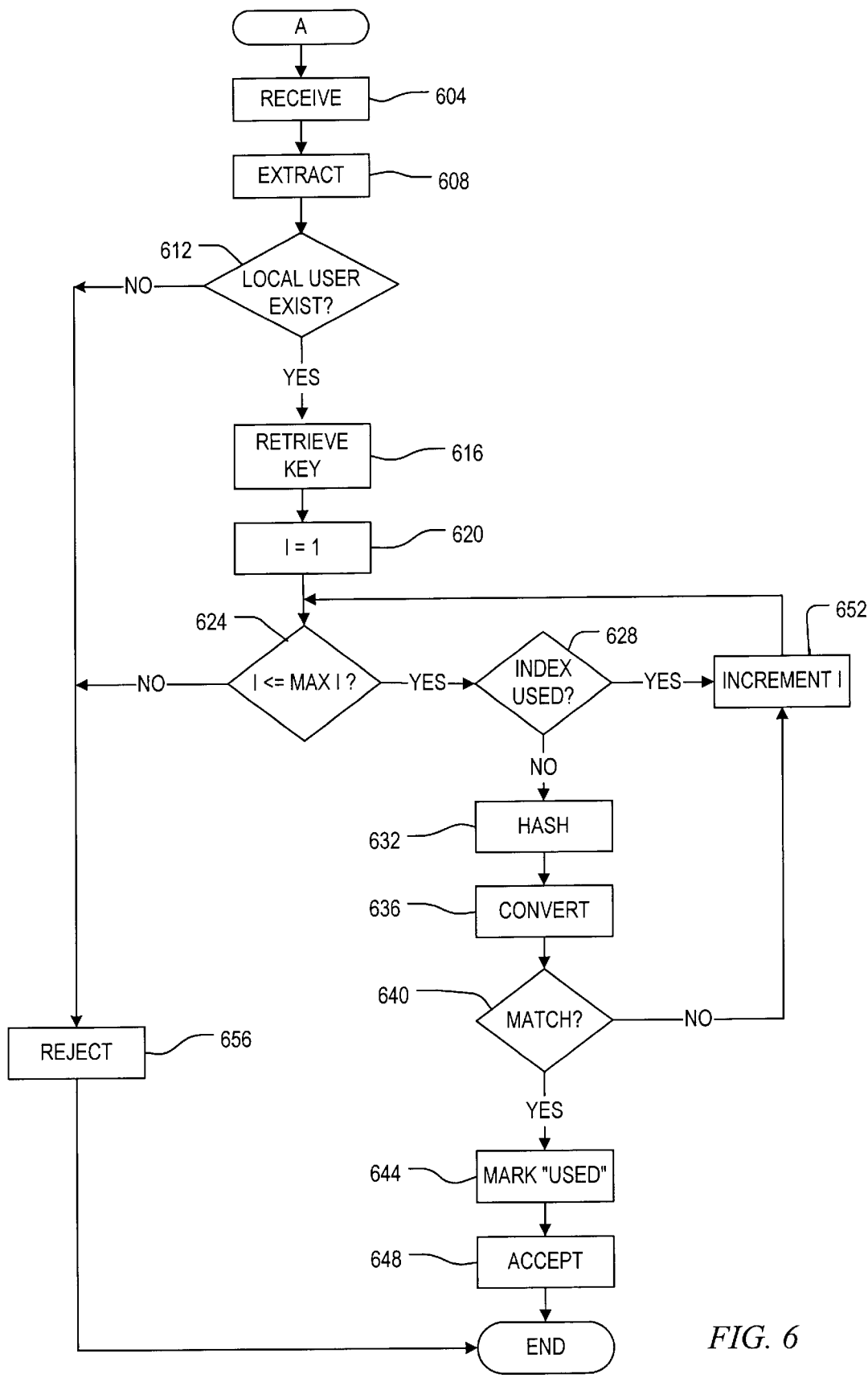
FIG. 6 is a flowchart depicting the steps of verifying a unique digital signature.

The unique digital signature 132 is returned to the requestor at step 528 (e.g., via an electronic message from message server 408, or an interface on WWW server 424) and the process ends. In one embodiment, the unique digital signature 132 (or a block of unique digital signatures) is returned the remote user (e.g., a user on laptop 452) as an update to a cookie log in a WWW browser (i.e., Netscape's Navigator 4.0.) Turning now to FIG. 6, it depicts the steps for verifying a unique digital signature 132. In step 604, the unique digital signature is received by the authenticated message server 428. The component parts of the unique digital signature 132 are extracted in step 608 (e.g., the service id 104 and the adapted digital signature 144.) In step 612, the service id 104 is tested to verify that it represents a valid local username or servicename. If the service id 104 is not valid, then the request for service is rejected at step 656. If the service id 104 is valid, then processing continues to step 616.

Note that the unique digital signature 132 can also be rejected based upon the system key number 140. For example, a particular system key can expire due to the lapse of time (e.g., all keys with system key numbers less than "2" can be rejected automatically because of their creation date) or because those system keys have been flagged as "used", or both. According to one embodiment, the above described test is performed before step 620. However, according to another embodiment, the above described test is performed after step 608.

In step 616, the system key 108 is retrieved from the authentication log file 432. According to one embodiment, the system key number 140 was identified in the service id 136, which was extracted at step 608. Once the system key 108 is located, the index number 112 is set to one in step 560. In step 624, the index number 112 ("I") is tested to determine whether it is less than or equal to the maximum number of bits available in bit vector 240 ("MAX I"). If the index number 112 is less than or equal to MAX I, then processing continues to step 628, otherwise the process continues to step 656.

Next, in step 628, the index number 112 is tested to determine whether it has already been used. The test at step 628 is performed by testing a bit in bit vector 224, the bit being identified by the index number 112 and the system key number 140. For example, bit 241 of bit vector 224 in record 212—identified by index number 112 having a value of "1" and system key number "2"—in the authentication log file 432. If the index number 112 is marked as "used", then processing continues to step 652, wherein the index number 112 is incremented by one and the process returns to step 624. Otherwise, processing continues to step 632.

According to an alternative embodiment, step 624 is not performed before step 628. Rather, step 624 is performed after step 652. Either way, step 624 flows to step 628 or step 656, depending on the outcome of the test at step 624.

With the system key 108, the service id 104 (which can be only a portion of the service id 136) and the index number 112, the digital signature engine 120 performs a one-way hash function 116 at step 632. In an alternative embodiment, the service id 104 is not an input to the one-way hash function 116. Next, in step 636, the resulting hash value (digital signature 124) is converted from a first digital format, to a second digital format (e.g., binary to ASCII) using an adaptation algorithm 128 (e.g., a base64 conversion). The resulting value, an adapted digital signature 144, is compared against the adapted digital signature in the incoming unique digital signature at step 640. If the two values match, then processing continues to step 644, described below. If the two values do not match, then processing continues to step 652, described above.

In step 644, the corresponding bit of bit vector 224 is marked as used. For example, bit 241 of bit vector 224 in record 212 is set to "1". Finally, in step 648, the incoming request is accepted and notification of the successful authentication is returned. The authentication process then ends, however, other processing/handling of the request for service continues—depending on the particular application where the unique digital signature is employed.

Figure 7:
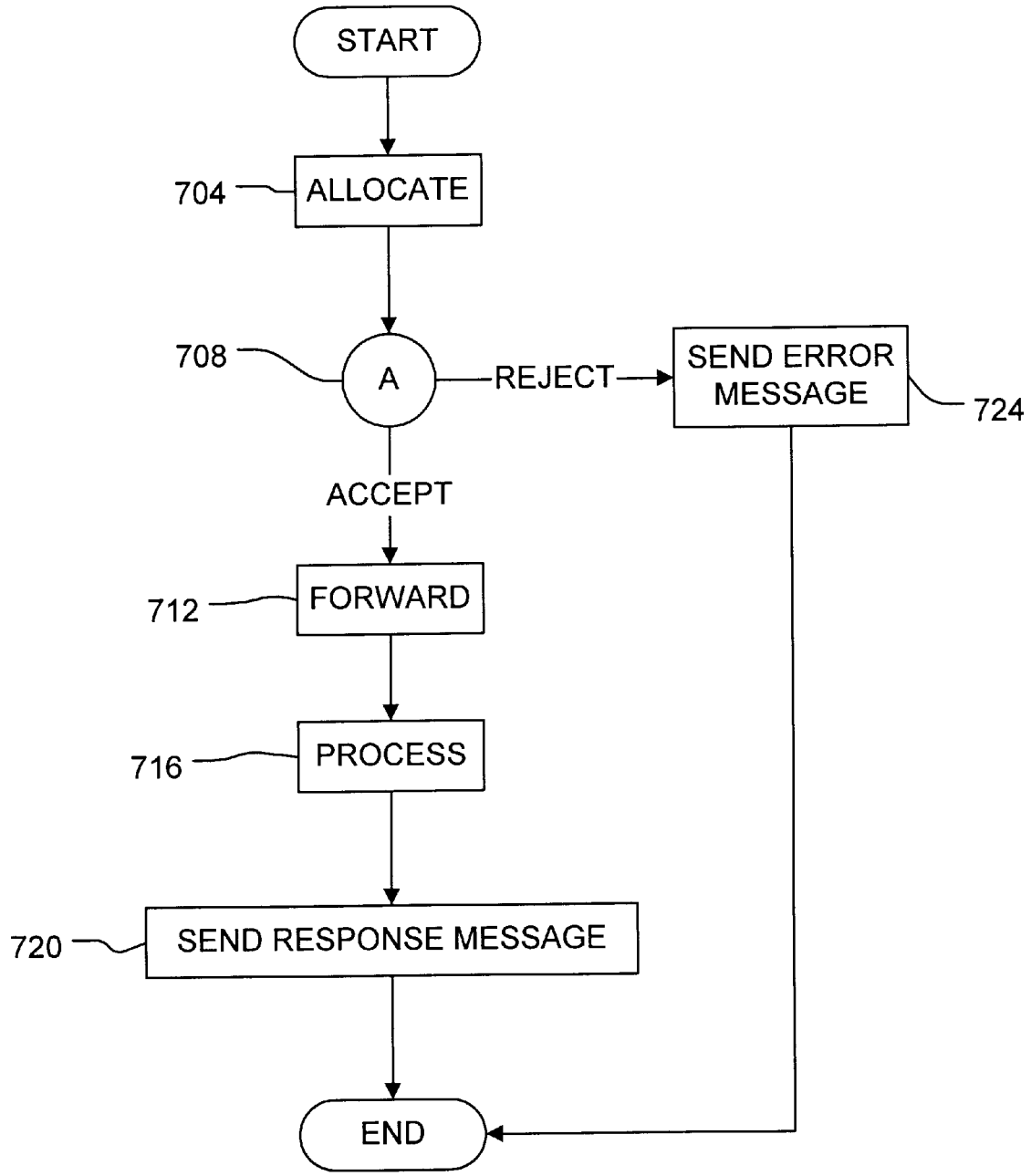
FIG. 7 is a flowchart depicting the present invention as employed in a unique electronic commerce system.

FIG. 7 depicts the steps of an electronic commerce or service system wherein the methods and techniques described herein can be employed. In step 704, a unique digital signature 132 is allocated. Preferably, the unique digital signature 132 is allocated based upon the steps depicted in the flowchart described above with reference to FIG. 5. However, additional steps can also be involved, such as the collection of money to purchase the unique digital signature 132. After step 704, a remote user in possession of a unique digital signature 132 may wish to purchase something with the unique digital signature 132. If so, then the remote user sends a request addressed with the unique digital signature 132, which is received by the authenticated message server 428 and authenticated in step 708, preferably by performing the authentication process described above with reference to FIG. 6.

According to an alternative embodiment, WWW server 424 (FIG. 4) prompts the remote user for access to any unique digital signatures stored in a cookie file on laptop 452. If the remote user authorizes the WWW server 424, the WWW server 424 retrieves a unique digital signature 132 from the cookie file.

If the unique digital signature 132 cannot be validated, that is it is rejected by the authentication process "A", then an error message is returned to the requestor. If the unique digital signature 132 is validated by the authentication process "A", that is it is accepted, then processing continues to step 712. In step 712, the successfully validated unique digital signature 132 is forwarded to a particular username or automated process (servicename). Next, in step 716, the request identified by the unique digital signature 132 is processed by a stored procedure, or by a local user, as the case may be. Finally, at step 720, a response message is returned to the remote user of the unique digital signature 132. According to one embodiment, media files are returned, such as Java applets, one or more bundled HTML files, an MPEG file, a WAV file, or a RAM file. In another embodiment, the media files are stored on a proxy server 420 and accessed at the proxy server 420 by the remote user.

For example, one application where a unique digital signature 132 can be employed is in an electronic voting or polling system. In such a system, the unique digital signature 132 is allocated by the authenticated message server 428 at step 704. In one embodiment, the unique digital signature 132 is sent to a remote user (e.g., 452) via WWW server 424. In another embodiment the unique digital signature 132 is sent via electronic message server 408. In still another embodiment, the unique digital signature 132 is sent via "snail mail" to the remote user's personal home address. Next, the remote user logs in to Java based voting application interface residing on the WWW server 424. The WWW server 424 then presents a number of prompts (e.g., check boxes) and voting information (such as candidate or referendum information). Once the remote user has sufficiently responded to the prompts, the responses are validated to ensure that logical constraints have not been violated (e.g., selecting more than one candidate for a particular elected position). After the responses are validated, the WWW server 424 interface prompts the remote user for their unique digital signature 132. With the unique digital signature 132, the WWW server 424 also accepts the remote user's responses to the polling questions. The unique digital signature 132 is authenticated at step 708 (see FIG. 6) and, if accepted, is the remote user's selections are forwarded to an automated processing machine, such as computer 404. The computer 404 processes the remote user's voting selections at step 716 and, according to one embodiment, coordinates a reply message back to the remote user informing the remote user that the remote user's votes were recorded. The reply message can also contain the remote user's selections/votes.

If the unique digital signature 132 was discarded at step 708, one of at least three responses (step 724) is appropriate. One response is to completely disregard the failed unique digital signature 132 and voting responses and delete them from the unique digital signature system 400. Another response is to record the failed attempt in a failure log file that a system administrator can later analyze for unusual activity. A third response is to record the failed unique digital signature 132 in the failure log file and notify the remote user of the failure (for example, including the voter's response so that the remote user can reattempt the voting process without tediously reviewing each question.)

According to one embodiment, the steps for generating an authenticating a unique digital signature 132 are performed by a computer program running on a stand-alone server (e.g., 428), or in an add-on software component in servers 424 or 408.

In one embodiment, the instructions for performing the methods and techniques described herein (the computer program) can be stored on a computer readable medium, such as an electromagnetic storage device (e.g., a floppy disk, a magnetic tape, a hard-disk drive, or other persistent memory device), or an optical data storage medium (e.g., a CD-ROM). Generally, prior to execution of the sequences of instructions, the sequences of instructions are copied from a non-volatile computer readable medium (e.g., the hard-disk drive) to a volatile source (e.g., random access memory) and are executed from the volatile computer readable medium. For purposes of explanation the methods and techniques described herein are performed by the authenticated message server 428. Where the actual functionality is performed, that is on which piece of hardware, is not important for purposes of this description. For example, server 308 can be configured to perform the functionality of both a regular message server and a unique digital signature message server, wherein the message server automatically replaces the sender's e-mail address with the unique digital signature in response to a prefix before the desired recipient's address (e.g., "onetime.jenny@mailer.com").

In the foregoing specification, the invention has been described with reference to specific embodiments thereof. It will be evident, however, that various modifications and changes can be made thereto without departing from the broader spirit and scope of the invention. For example, larger or smaller system keys 108 (e.g., 48 or 128 bit system keys) can be employed. Further, the adapted digital signature 144 can be truncated in order to not exceed the boundaries of the address field for an electronic message. Further still the authenticated message server functionality can be incorporated into a message server (e.g. server 308 or server 408), rather than being a stand-alone device. The specification and drawings are, accordingly, to be regarded in an illustrative, rather than a restrictive sense.

What is claimed is:

1. A method for generating a unique digital signature comprising:
    receiving a request for said unique digital signature;
    incrementing an index number corresponding to a system key;
    executing a one-way hash function, using said index number and said system key as inputs, said one-way hash function producing a hash value in a first digital format;
    transforming said hash value in said first digital format into a second digital format, and using said transformed hash value in said second digital format as an adapted digital signature;
    concatenating said adapted digital signature and said service id to form said unique digital signature; and
    returning said unique digital signature.

2. The method of claim 1, further comprising:
    testing said index number against a maximum index number;
    if said index number is greater than said maximum index number, then:
        incrementing a system key number;
        generating a new value for said system key;
        storing said new value for said system key in an authentication log file; and
        resetting said index number.

3. The method of claim 1, wherein said adapted digital signature can be successfully authenticated only a fixed number of times.

4. The method of claim 3, wherein said system key is not shared with a remote electronic message system.

5. A method for authenticating a unique digital signature comprising:
    extracting an adapted digital signature and a service id from said unique digital signature;
    testing said service id to ensure said service id is valid;
    verifying said adapted digital signature is valid by:
        retrieving a system key from a plurality of system keys;
        hashing said system key with an index number to form a hash value;
        converting said hash value from a binary format into a second digital format;
        comparing said hash value in said second digital format with said adapted digital signature;
        incrementing said index number; and
        repeating said act of hashing if said hash value in said second digital format and said adapted digital signature do not match; and
    in response to said act of verifying:
        setting an indicator in an authentication log file, said indicator designating said index number and said system key combination as used; and
        granting access to an electronic service corresponding to said service id.

6. The method of claim 5, in response to said act of verifying, if said adapted digital signature is not valid, then further performing the acts of:
    recording failure information into a failure log file; and
    denying access to said electronic service.

7. The method of claim 5, further comprising receiving an electronic message, said electronic message comprising a message body and a message header, said message header comprising said unique digital signature.

8. The method of claim 5, wherein said electronic service includes an electronic messaging service, said electronic messaging service configured to respond to receipt of said unique digital signature by sending a reply message including media to a remote user that sent said unique digital signature.

9. The method of claim 5, wherein said electronic service includes a wireless short message service message, and said wireless short message service configured to respond to receipt of said unique digital signature by forwarding a message to a wireless receiver corresponding to said unique digital signature.

10. The method of claim 5, wherein said electronic service includes an electronic voting system, and said electronic voting system configured to respond to receipt of said unique digital signature by recording a vote corresponding to said unique digital signature.

11. The method of claim 5, wherein said adapted digital signature can be successfully authenticated only a fixed number of times.

12. The method of claim 11, wherein said system key is not shared with a remote electronic message system.

13. The method of claim 5, further comprising:
    testing a memory location identified by said system key and said index number, prior to said step of verifying said adapted digital signature; and
    rejecting said unique digital signature if said memory location indicates that said system key and said index number combination has been used.

14. A computer readable medium having stored therein one or more sequences of instructions for generating a unique digital signature, said one or more sequences of instructions causing one or more processors to perform a plurality of acts, said acts comprising:

receiving a request for a unique digital signature;
  incrementing an index number corresponding to a system key;
  executing a one-way hash function, using said index number and said system key as inputs, said one-way hash function producing a hash value in a first digital format;
  transforming said hash value in said first digital format into a second digital format, and using said transformed hash value in said second digital format as an adapted digital signature;
  concatenating said adapted digital signature and said service id to form said unique digital signature; and
  returning said unique digital signature.

15. The computer readable medium of claim 14, further comprising:
  testing said index number against a maximum index number;
  if said index number is greater than said maximum index number, then:
    incrementing a system key number;
    generating a new value for said system key;
    storing said new value for said system key in an authentication log file; and
    resetting said index number.

16. The computer readable medium of claim 14, wherein said adapted digital signature can be successfully authenticated only a fixed number of times.

17. The computer readable medium of claim 16, wherein said system key is not shared with a remote electronic message system.

18. A computer readable medium having stored therein one or more sequences of instructions for authenticating a unique digital signature, said one or more sequences of instructions causing one or more processors to perform a plurality of acts, said acts comprising:
  extracting an adapted digital signature and a service id from said unique digital signature;
  testing said service id to ensure said service id is valid;
  verifying said adapted digital signature is valid by:
    retrieving a system key from a plurality of system keys;
    hashing said system key with an index number to form a hash value;
    converting said hash value from a binary format into a second digital format;
    comparing said hash value in said second digital format with said adapted digital signature;
    incrementing said index number; and
    repeating said act of hashing if said hash value in said second digital format and said adapted digital signature do not match; and
  in response to said act of verifying:
    setting an indicator in an authentication log file, said indicator designating said index number and said system key combination as used; and
    granting access to an electronic service corresponding to said service id.

19. The computer readable medium of claim 18, wherein in response to said act of verifying, if said adapted digital signature is not valid, then further comprising:
  recording failure information into a failure log file; and
  denying access to said electronic service.

20. The computer readable medium of claim 18, further comprising receiving an electronic message, said electronic message comprising a message body and a message header, said message header comprising said unique digital signature.

21. The computer readable medium of claim 18, wherein said electronic service includes an electronic messaging service, said sequences of instructions configured to cause said electronic messaging service to respond to receipt of said unique digital signature by sending a reply message including media to a remote user that sent said unique digital signature.

22. The computer readable medium of claim 18, wherein said electronic service includes a wireless short message service, said sequences of instructions configured to cause said wireless short message service to respond to receipt of said unique digital signature by forwarding a message to a wireless receiver corresponding to said unique digital signature.

23. The computer readable medium of claim 18, wherein said electronic service includes an electronic voting system, said sequences of instructions configured to cause said electronic voting system to respond to receipt of said unique digital signature by recording a vote corresponding to said unique digital signature.

24. The computer readable medium of claim 18, wherein said adapted digital signature can be successfully authenticated only a fixed number of times.

25. The computer readable medium of claim 24, wherein said system key is not shared with a remote electronic message system.

26. The method of claim 24, further comprising:
  testing a memory location identified by said system key and said index number, prior to said step of verifying said adapted digital signature; and
  rejecting said unique digital signature if said memory location indicates that said system key and said index number combination has been used.

* * * * *

UNITED STATES PATENT AND TRADEMARK OFFICE
CERTIFICATE OF CORRECTION

Page 1 of 2

PATENT NO. : 6,085,321
DATED : July 4, 2000
INVENTOR(S) : Benjamin K. Gibbs et al.

It is certified that error appears in the above-identified patent and that said Letters Patent is hereby corrected as shown below:

IN THE BACKGROUND OF THE INVENTION

At column 1, line 9, change "(APRA)" to --(ARPA)--

At column 1, line 27, delete "the" appearing before the word "both".

At column 1, line 55, change "computers" to --computer--.

At column 2, line 37, change "service" to --services--

UNITED STATES PATENT AND TRADEMARK OFFICE
CERTIFICATE OF CORRECTION

PATENT NO. : 6,085,321
DATED : July 4, 2000
INVENTOR(S) : Benjamin K. Gibbs et al.

It is certified that error appears in the above-identified patent and that said Letters Patent is hereby corrected as shown below:

IN THE DETAILED DESCRIPTION

At column 3, line 24, change "104" to --136--.

IN THE CLAIMS

At column 11, line 52, after "adapted digital signature and" change "said" to --a--.

At column 13, line 15, after "adapted digital signature and" change "said" to --a--.

Signed and Sealed this

Tenth Day of April, 2001

*Attest:*

NICHOLAS P. GODICI

*Attesting Officer*   *Acting Director of the United States Patent and Trademark Office*